April 5, 1932.  A. F. MASURY  1,852,429
STUFFING BOX CONSTRUCTION
Original Filed July 14, 1926
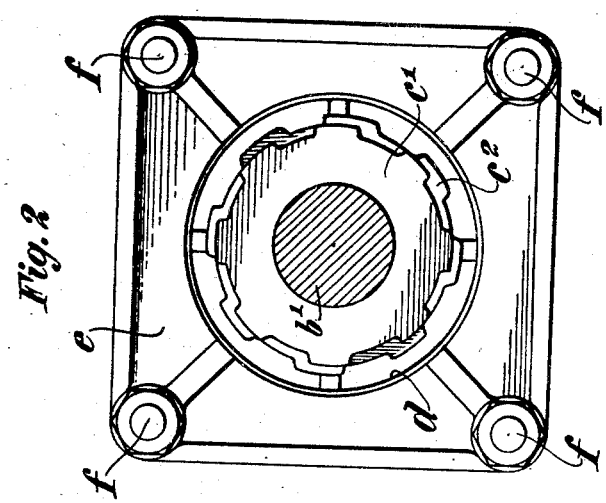
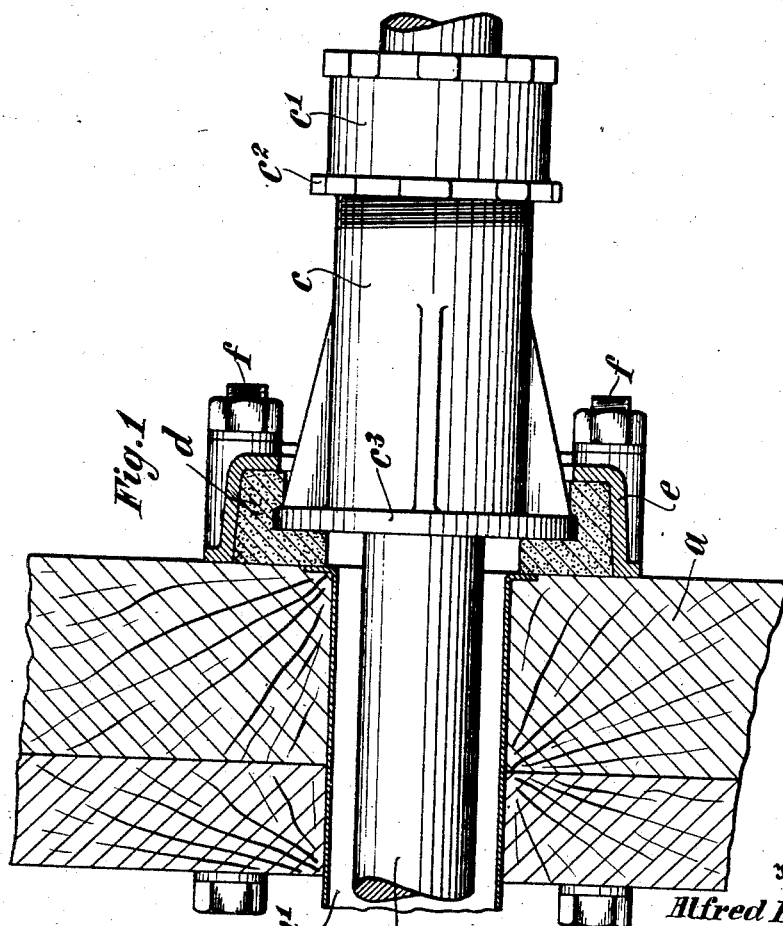
Inventor:
Alfred F. Masury,
By his Attorneys
Redding, Greeley, O'Shea & Campbell Patented Apr. 5, 1932

1,852,429

UNITED STATES PATENT OFFICE

ALFRED F. MASURY, OF NEW YORK, N. Y., ASSIGNOR TO THE RUBBER SHOCK INSULATOR CORPORATION, OF WILMINGTON, DELAWARE, A CORPORATION OF DELAWARE

STUFFING BOX CONSTRUCTION

Original application filed July 14, 1926, Serial No. 122,528. Divided and this application filed January 6, 1928. Serial No. 244,789.

This invention relates to stuffing boxes for propeller shafts in marine use. With a view to maintaining a water-tight joint between the hull and the rotating shaft, it provides, not only this function, but also serves to relieve the hull of the deleterious vibrations which exist in the shaft and are ordinarily transmitted to the hull and passenger accommodations.

It is a well known fact that propeller shafts receive occasional severe shocks, as when the propeller is momentarily out of water, or when it strikes a floating object. In addition, the shafts also are under continual vibration due to slight irregularities in the propeller construction which cause lateral thrusts in the shafts. Wherever the shafts are connected to the hull, these vibrations will be transmitted thereto, and the resulting effect frequently becomes quite objectionable, both from the standpoint of personal comfort and wear upon the boat.

This application is a division of the application of Alfred F. Masury, Serial No. 122,528 filed July 14, 1926, now Patent No. 1,755,549, issued April 22, 1930, for cushioning devices for marine propulsion, and has for an object the provision of a stuffing-box construction which not only effectively seals the shaft in the bulkhead through which it passes, but also serves to permit a degree of movement of the shaft with respect thereto while cushioning such movement. The shaft movement does not impair the seal between it and the bulkhead and the structure is designed to cushion such movement effectively.

Further and other objects of the invention will appear as the description proceeds and reference will now be had to the accompanying drawings wherein:

Figure 1 is a view in elevation, partly in section, showing a preferred form of stuffing box mounting for marine use.

Figure 2 is a front elevational view of the mounting shown in Figure 1.

The bulkhead of a boat is indicated at $a$ in Figure 1 of the drawings. Within this bulkhead is carried a sleeve $a'$, preferably of copper, through which the propeller shaft $b'$ may pass.

This propeller shaft carries a stuffing box $c$ of usual form, having a packing nut $c'$ and a lock nut $c^2$. Ordinarily the stuffing box $c$ is bolted directly to the bulkhead and the shaft is secured to the bulkhead in this manner, the packing nut $c'$ and lock nut $c^2$ being disposed well within the interior of the vessel. In the present instance, the flange $c^3$ which is formed on the stuffing box is received within an annular block $d$, of rubber, and the stuffing box is wholly supported upon the bulkhead through such annular block. This rubber block serves not only as a cushioning means between the bulkhead and stuffing box but also effectively seals the joint therebetween.

A suitable housing $e$ carries the block $d$ and is secured to the bulkhead by bolts $f$. The relative sizes of the block and housing are such that the latter places the former under a desired degree of compression when the bolts $f$ are tightened. This results in causing the rubber to flow around the flange and bulkhead and not only seals the joint therebetween but also provides a positive mounting for the shaft and stuffing box. Vibrations set up in the shaft will be deadened by the cushioning element and a far more satisfactory operation results.

The details of construction may be varied to suit the convenience of various installations and the invention is not to be limited save as defined in the appended claim.

I claim as my invention:

A connection between the hull of a vessel and a propeller shaft comprising a stuffing box therefor formed with a flange, an annulus of yielding non-metallic resilient material engaging the flange and forming a water-tight connection therewith, a metallic annulus engaging the yielding non-metallic material and forming a water-tight connection between such material and the hull, and bolts to secure the annulus to the hull and retain the yielding non-metallic material under compression and support the stuffing box on the hull solely through engagement with the yielding material.

This specification signed this 22d day of December, A. D. 1927.

ALFRED F. MASURY.